US006517354B1

United States Patent
Levy

(10) Patent No.: US 6,517,354 B1
(45) Date of Patent: Feb. 11, 2003

(54) MEDICAL SIMULATION APPARATUS AND RELATED METHOD

(76) Inventor: David Levy, 4975 Ocean Blvd., San Diego, CA (US) 92109

( * ) Notice: Subject to any disclaimer, the term of this patent is extended or adjusted under 35 U.S.C. 154(b) by 0 days.

(21) Appl. No.: 09/715,432

(22) Filed: Nov. 17, 2000

(51) Int. Cl.[7] .............................................. G09B 23/28
(52) U.S. Cl. ....................... 434/262; 434/267; 434/268
(58) Field of Search ................................ 434/265–275; 600/416, 419, 500, 504

(56) References Cited

U.S. PATENT DOCUMENTS

| 2,556,043 | A | * | 6/1951 | Roucka ...................... 417/244 |
|---|---|---|---|---|
| 3,226,846 | A | * | 1/1966 | Wood .......................... 434/272 |
| 3,376,660 | A | * | 4/1968 | McGinnis ................... 434/268 |
| 3,579,858 | A | * | 5/1971 | Bentov ........................ 434/272 |
| 3,631,607 | A | * | 1/1972 | Kolff et al. ..................... 73/168 |
| 3,673,705 | A | | 7/1972 | Wright et al. |
| 4,058,910 | A | * | 11/1977 | Funk ........................... 434/262 |
| 4,198,766 | A | | 4/1980 | Camin |
| 4,321,047 | A | * | 3/1982 | Landis ........................ 434/262 |
| D292,932 | S | * | 11/1987 | McGinley ................... 434/262 |
| 5,176,153 | A | * | 1/1993 | Eberhardt ................... 128/897 |
| 5,320,537 | A | * | 6/1994 | Watson ........................ 434/272 |
| 5,425,644 | A | * | 6/1995 | Szinicz ........................ 434/267 |
| 5,620,326 | A | * | 4/1997 | Younker ...................... 434/268 |
| 5,632,623 | A | * | 5/1997 | Kolff et al. .................. 434/267 |
| 5,873,863 | A | | 2/1999 | Komlosi et al. |
| 5,947,743 | A | * | 9/1999 | Hasson ......................... 40/381 |
| 5,951,301 | A | * | 9/1999 | Younker ...................... 434/268 |
| 6,062,866 | A | * | 5/2000 | Prom .......................... 434/262 |
| 6,106,301 | A | * | 8/2000 | Merril ......................... 434/262 |
| 6,193,669 | B1 | * | 2/2001 | Degany et al. ............. 600/486 |
| 6,205,871 | B1 | * | 3/2001 | Saloner et al. .............. 430/325 |
| 6,234,804 | B1 | * | 5/2001 | Yong ........................... 434/267 |

* cited by examiner

Primary Examiner—Derris H. Banks
Assistant Examiner—Dmitry Suhol
(74) Attorney, Agent, or Firm—Allen, Dyer, Doppelt, Milbrath & Gilchrist, P.A.

(57) ABSTRACT

A medical simulation apparatus may include a housing, a vessel simulating tube carried by the housing, a liquid reservoir carried by the housing, a pump carried by the housing for circulating the liquid from the liquid reservoir through the vessel simulating tube, and an access port in fluid connection with the vessel simulating tube for receiving an instrument therein. The pump may be a pulsatile pump for providing a pulsed liquid circulation simulating blood flow. Also, the vessel simulating tube may include an elastic material (e.g., silicone) expandable with the pulsed liquid circulation. Furthermore, the vessel simulating tube may include a portion having an enlarged diameter simulating an aneurysm, or it may include a portion having a restriction simulating a stenosis. Alternately, the vessel simulating tube may include a portion simulating an arteriovenous malformation or tumor.

26 Claims, 2 Drawing Sheets

MEDICAL SIMULATION APPARATUS AND RELATED METHOD

FIELD OF THE INVENTION

The present invention relates to the field of medicine, and, more particularly, to a simulation apparatus and related methods relating to blood vessel treatment.

BACKGROUND OF THE INVENTION

In the field of medicine it is often desirable to test or practice with a medical instrument in a simulated environment. This allows new instruments to be tested and demonstrated, and it also allows health care providers to be trained on such instruments. For example, U.S. Pat. No. 4,198,766 to Camin entitled "Intravenous Training/Demonstration Aid" discloses a device for demonstrating intravenous techniques including a base with recessed curves therein and respective vein-simulating tubes removably seated in each recessed curve. The device may be used as an artificial training aid for demonstrating the use of needles, catheters, or the like. Fluid may also be circulated through the vein-simulating tubes to simulate blood flow.

Another surgical demonstration device is disclosed in U.S. Pat. No. 5,873,863 to Komlosi et al. entitled "Vascular Surgery Demonstration/Training Kit." The kit is used for demonstrating suturing techniques and includes a vascular simulation tube mounted on supports on a frame. The tube may be cut to form two slits therein, for example, and the slits may subsequently be repaired using different suturing instruments or techniques. A fluid conduit carries a blood simulating fluid to the vascular simulation tube, and the blood simulating fluid is pressurized until one of the slits begins to leak. As such, the effectiveness of the different suturing instruments or techniques may be compared. The kit also includes a pressure gauge for measuring the liquid pressure at which leaking occurs.

Despite their advantages, the above prior art devices do not provide a way to model and simulate treatment of certain vascular conditions, such as an aneurysm, stenosis, or arteriovenus malformation. In addition, viewing may be somewhat difficult and would not typically realistically simulate what the doctor would see during an actual procedure using a video camera and monitor.

SUMMARY OF THE INVENTION

In view of the foregoing background, it is therefore an object of the invention to provide an apparatus for simulating certain vascular conditions, such as aneurysms, stenoses, or arteriovenous malformations.

This and other objects, features, and advantages in accordance with the present invention are provided by a medical simulation apparatus, which in one embodiment may include a housing, a vessel simulating tube carried by the housing, a liquid reservoir carried by the housing, a pump carried by the housing for circulating the liquid from the liquid reservoir through the vessel simulating tube, and an access port in fluid connection with the vessel simulating tube for receiving an instrument therein. Accordingly, a catheter carrying a stent or other treatment device or instrument, for example, may be positioned through the access port to the vessel simulating tube. The apparatus is not only useful for training, but may also be used for engineering evaluation, and/or sales presentations.

The pump may be a pulsatile pump for providing a pulsed liquid circulation simulating blood flow. Also, the vessel simulating tube may include an elastic material (e.g., silicone, rubber, or plastic) expandable with the pulsed liquid circulation. The vessel simulating tube may also comprise glass. Furthermore, the vessel simulating tube may include a portion having an enlarged diameter simulating an aneurysm, or it may include a portion having a restriction simulating a stenosis. Alternately, it may include a porous material or tangle of passageways simulating an arteriovenous malformation or tumor.

The apparatus may also include a pressure release shunt connected in parallel with the vessel simulating tube for allowing the liquid to circulate if the vessel simulating tube becomes blocked. A light source may be mounted in the housing for illuminating the vessel simulating tube. More specifically, a translucent stage may be provided in the housing. The vessel simulating tube may be mounted adjacent a top side of the translucent stage and the light source may be mounted adjacent a bottom side of the translucent stage. Additionally, the housing may be a portable case comprising a bottom and a top pivotally connected to the bottom.

In accordance with another advantageous feature of the invention, the apparatus may include a camera to be positioned adjacent the vessel simulating tube, and a display connected to the camera for providing an image of the vessel simulating tube. Accordingly, a doctor during training could have a realistic view similar to what would be available during an actual patient procedure.

A method aspect of the invention is for medical simulation using the apparatus described briefly above. The apparatus may include a housing, a vessel simulating tube carried by the housing, a pump carried by the housing and connected in fluid communication with the vessel simulating tube, and an instrument access port connected in fluid communication with the vessel simulating tube. The method may comprise circulating the liquid through the vessel simulating tube using the pump, and inserting an instrument through the access port to the vessel simulating tube. The inserting may be performed during circulating of the liquid. The pump may be a pulsatile pump, and wherein circulating may include providing pulsed liquid circulation simulating blood flow.

The vessel simulating tube may include an elastic material expandable with the pulsed liquid circulation. In addition, the vessel simulating tube may comprise a portion having an enlarged diameter simulating an aneurysm, and wherein inserting the instrument comprises inserting an instrument to treat an aneurysm. The vessel simulating tube may alternately comprise a portion defining a restriction simulating a stenosis. In this variation, inserting the instrument comprises inserting an instrument to treat a stenosis. Alternately, the vessel simulating tube may simulate an areriovenous malformation or tumor, and inserting an instrument may comprise inserting an instrument to position embolic devices to close the vessels for treatment.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation and multiple prime notation are used to indicate similar elements in alternative embodiments.

Figure 1:
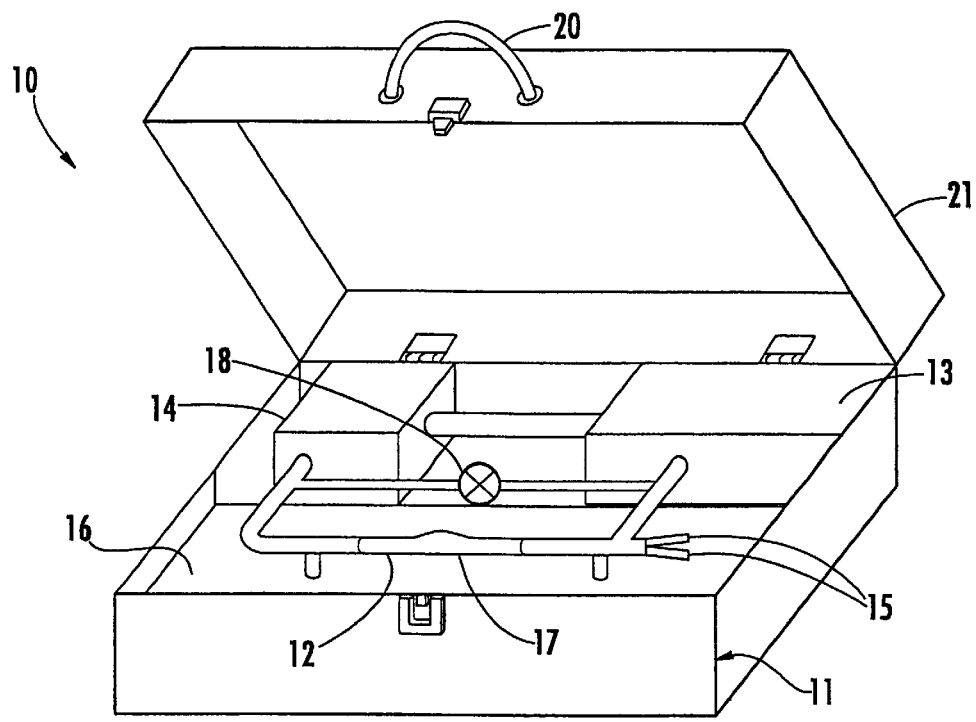
FIG. 1 is a perspective view of a medical simulation apparatus according to the invention.
Figure 2:
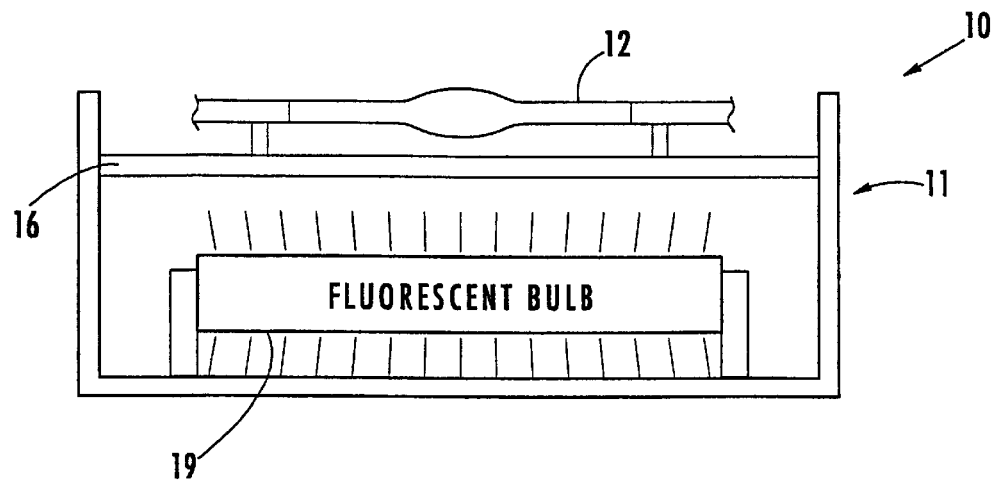
FIG. 2 is cross-sectional view of the medical simulation apparatus of FIG. 1.

Referring now to FIGS. 1 and 2, a medical simulation apparatus 10 according to the present invention is first described. The apparatus 10 includes a housing 11 and a vessel simulating tube 12 carried by the housing. The vessel simulating tube 12 includes a portion 17 with an enlarged diameter simulating an aneurysm, which will be discussed further below. The apparatus 10 also includes a liquid reservoir 13 carried by the housing 11, and a pump 14 also carried by the housing for circulating the liquid from the liquid reservoir through the vessel simulating tube 12.

The liquid preferably has flow characteristics similar to that of blood to provide for a more realistic simulation. The vessel simulating tube 12 may be translucent, and the liquid may also be translucent to aid in viewing. For example, the liquid may be water, although other suitable fluids known to those of skill in the art may also be used.

One or more access ports 15 are in fluid communication with the vessel simulating tube 12, for receiving instruments therein. That is, the access ports 15 allow instruments to be inserted for treating vascular conditions, such as aneurysms or stenoses, for example. The access ports 15 allow an instrument to be easily and conveniently inserted into and removed from the vessel simulating tube 12 with substantially no leakage of fluid, as will be appreciated by those of skill in the art.

To further enhance the realistic conditions of the demonstration, the pump 14 may be a pulsatile pump which provides a pulsed liquid circulation simulating actual blood flow. Of course, those of skill in the art will appreciate that other suitable pumps may also be used in accordance with the invention, and that such pumps may be battery operated, or operated from low voltage power supplies connected to the utility power distribution system, for example.

The vessel simulating tube 12 may be made from an elastic material, such as silicone, rubber, plastic or other similar materials, for example, that are expandable with the pulsed liquid circulation from the pump 14. The vessel simulating tube 12 may respond to the pulsatile flow very similar to an actual vessel, such as a vein or artery. The vessel simulating tube 12 may also comprise glass or other inelastic materials in other embodiments.

Additionally, a pressure release shunt 18 may be connected in parallel with the aneurysm simulating tube 12. The pressure release shunt 18, which may be a pop-off type valve, for example, allows liquid to circulate if the vessel simulating tube 12 becomes blocked. This prevents damage to the device and prevents leaking.

The housing 11 may be a portable case for carrying the vessel simulating tube 12, the reservoir 13, the pump 14, and the access ports 15. The housing 11 may have a bottom 11a and a top 11b pivotally connected to the bottom. The pivotal connection may be provided by the illustrated spaced apart hinges 22. In other embodiments where the top and bottom comprise molded plastic, a living hinge formed by integral plastic material may provide the pivotal connection as will be appreciated by those skilled in the art. Of course, the housing 11 may be made from metal or other materials instead of or in addition to plastic. The housing 11 may have a footprint of about eight by eleven inches, for example, for ease of storage and transportation. The housing 11 may include a handle 20 mounted on the top 11b.

The housing 11 illustratively carries a light source 19 (e.g., a fluorescent light) mounted therein for illuminating the vessel simulating tube 12 and making the demonstration of instruments and techniques easier to view. More particularly, the housing 11 may carry a translucent stage 16 having top and bottom sides. The vessel simulating tube 12 is illustratively mounted adjacent the top side of the translucent stage 16 and the light source 19 is mounted adjacent the bottom side of the translucent stage.

Figure 3:
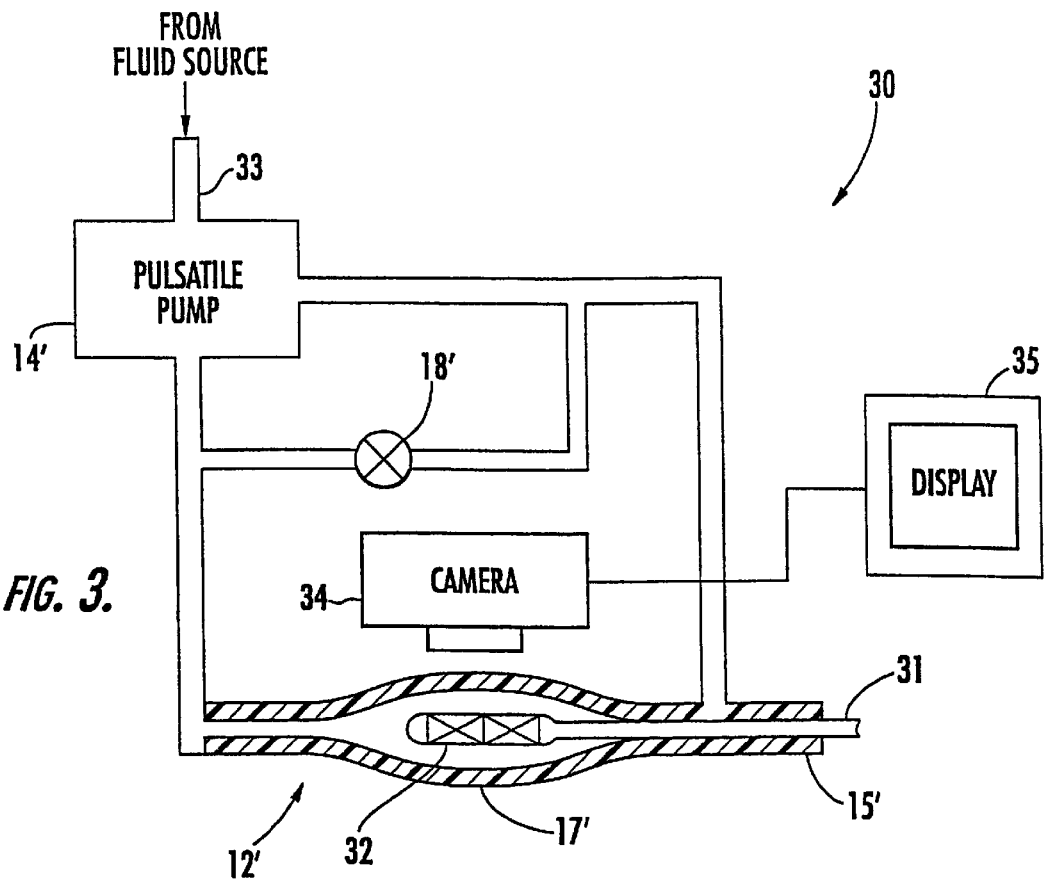
FIG. 3 is a schematic block diagram of the medical simulation apparatus as shown in FIG. 1 including a vessel simulating tube having an enlarged diameter portion therein simulating an aneurysm.

Referring now to the schematic diagram of FIG. 3, another embodiment according to the present invention of a medical simulation apparatus 30 is now described. The medical simulation apparatus 30 may include a housing (not shown) similar to that described above. A vessel simulating tube 12' is carried by the housing, and a pump 14', also carried by the housing, circulates a liquid through the vessel simulating tube. The liquid may come from a reservoir or from an external source, such as a hose connected to a water faucet, for example, through an inlet 33. Of course, those of skill in the art will appreciate that other configurations are possible and that fluid may be obtained from other suitable sources without departing from the scope of the invention.

Again, an access port 15' is in fluid connection with the vessel simulating tube for receiving an instrument 31 therein. The instrument 31 may be a catheter including a stent 32 thereon, for example, as shown in FIG. 3. Furthermore, a camera 34 may be positioned adjacent the vessel simulating tube 12' for providing an image of the vessel simulating tube on a video display 35, for example. Of course, those of skill in the art will appreciate that other cameras may be included, such as a camera mounted on an instrument to be inserted through the access port 15' into the vessel simulating tube 12', for example.

Figure 4:
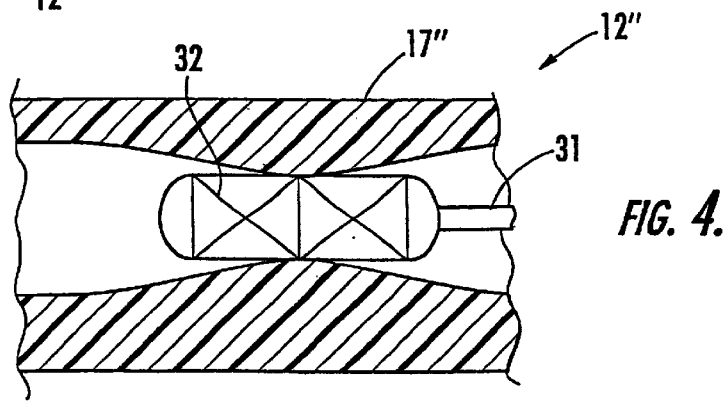
FIG. 4 is an enlarged cross-sectional view of an alternate embodiment of a vessel simulating tube including a restriction therein simulating a stenosis as may be used in the apparatus of FIG. 1.

To simulate an aneurysm, a portion 17' having an enlarged diameter is formed in the vessel simulating tube 12'. Alternatively, a vessel simulating tube 12" may include a reduced diameter portion simulating a restriction or stenosis 17" therein, as shown in FIG. 4.

Figure 5:
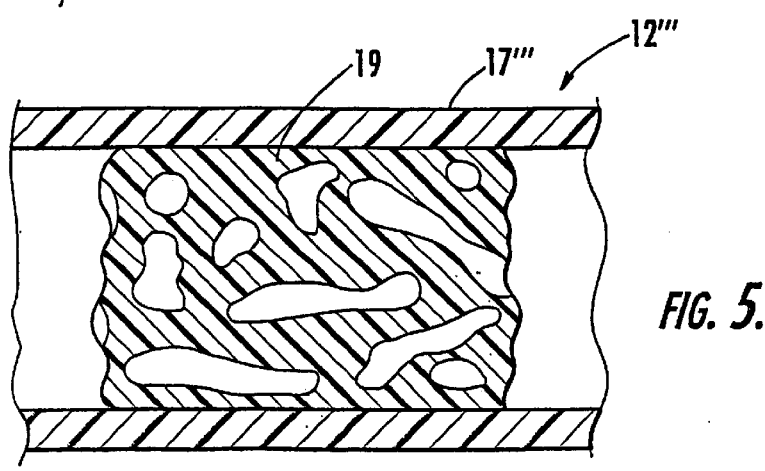
FIG. 5 is an enlarged cross-sectional view of another embodiment of a vessel simulating tube including a porous body therein simulating an arteriovenous malformation or tumor.

Referring to FIG. 5, another embodiment of a vessel simulating tube 12''', and which simulates an arteriovenous malformation or tumor, is now explained. The vessel simulating tube 12''' includes a porous body 21 within the portion 17''' of the tube. The porous body 21 includes a plurality of interconnected passageways therein similar to the arteriovenous malformation. In yet other embodiments, a plurality of interconnected small individual tubular portions could be provided in place of the porous body 21 as will be appreciated by those skilled in the art. The passageways defined in the porous body 21 may be sealed to simulate treatment thereof, such as by placing blocking or sealing material (e.g.

embolic devices) therein as will also be understood by those skilled in the art.

To further increase the realistic nature of the simulation provided by the apparatus of the present invention, the vessel simulating tubes according to the invention may be modeled from actual vascular segments exhibiting the above referenced conditions. For example, a human (or animal) artery having an aneurysm therein may be used as a mold and hot wax deposited thereon to form a wax sculpture of the aneurysm. After the wax solidifies and the artery is separated from the wax, silicone may be deposited in successive layers on the wax to a desired thickness. The wax is then melted away leaving a vessel simulating tube in the shape of an actual aneurysm. The same process may also be used for producing vessel simulating tubes simulating stenoses or other vascular conditions, as will be appreciated by those of skill in the art.

It will be appreciated that the present invention may advantageously be used not only for the development and testing of medical instruments, but also for demonstrations and training with such instruments, in a simulated yet realistic environment.

A method aspect of the invention is for medical simulation using the apparatus 10, 30 described =extensively above. The apparatus may include a housing, a vessel simulating tube carried by the housing, a pump carried by the housing and connected in fluid communication with the vessel simulating tube, and an instrument access port connected in fluid communication with the vessel simulating tube. The method may comprise circulating the liquid through the vessel simulating tube using the pump, and inserting an instrument through the access port to the vessel simulating tube. The inserting may be performed during circulating of the liquid. The pump may be a pulsatile pump, and wherein circulating may include providing pulsed liquid circulation simulating blood flow.

Those of skill in the art will recognize that the system and method aspects of the invention may be used for other similar endovascular or intravascular techniques. For example, the testing or evaluation of filters, balloons, intravascular imaging devices, or even certain extravascular devices or procedures can be performed. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A medical simulation apparatus comprising:
a housing;
a vessel simulating tube carried by said housing;
a liquid reservoir carried by said housing;
a pump carried by said housing for circulating the liquid from said reservoir and through said vessel simulating tube; and
an instrument access port connected in fluid communication with said vessel simulating tube.

2. An apparatus according to claim 1 wherein said pump comprises a pulsatile pump for providing pulsed liquid circulation simulating blood flow.

3. An apparatus according to claim 2 wherein said vessel simulating tube comprises an elastic material expanding and contracting with the pulsed liquid circulation.

4. An apparatus according to claim 1 wherein said vessel simulating tube comprises a portion having an enlarged diameter simulating an aneurysm.

5. An apparatus according to claim 1 wherein said vessel simulating tube comprises a portion defining a restriction simulating a stenosis.

6. An apparatus according to claim 1 wherein said vessel simulating tube comprises a portion simulating an arteriovenous malformation or tumor.

7. An apparatus according to claim 1 further comprising a pressure release shunt connected in parallel with said vessel simulating tube for allowing liquid to circulate if said vessel simulating tube becomes blocked.

8. An apparatus according to claim 1 further comprising a light source carried by said housing for illuminating said vessel simulating tube.

9. An apparatus according to claim 8 further comprising a translucent stage in said housing; and wherein said vessel simulating tube is adjacent a top side of said translucent stage and said light source is adjacent a bottom side of said translucent stage.

10. An apparatus according to claim 1 wherein said housing comprises a bottom and a top pivotally connected thereto.

11. An apparatus according to claim 1 further comprising:
a camera to be positioned adjacent said vessel simulating tube; and
a display connected to said camera for providing an image of said vessel simulating tube.

12. A medical simulation apparatus comprising:
a housing;
a translucent stage in said housing;
a vessel simulating tube carried by said housing and adjacent a top side of said translucent stage;
a pump carried by said housing for circulating liquid through said vessel simulating tube; and
a light source carried by said housing and adjacent a bottom side of said translucent stage for illuminating said vessel simulating tube.

13. An apparatus according to claim 12 further comprising:
a camera to be positioned adjacent said vessel simulating tube; and
a display connected to said camera for providing an image of said vessel simulating tube.

14. An apparatus according to claim 12 further comprising an instrument access port connected in fluid communication with said vessel simulating tube.

15. An apparatus according to claim 12 further comprising a liquid reservoir carried by said housing and connected in fluid communication with said pump and said vessel simulating tube.

16. An apparatus according to claim 12 wherein said pump comprises a pulsatile pump for providing pulsed liquid circulation simulating blood flow.

17. An apparatus according to claim 17 wherein said vessel simulating tube comprises an elastic material expandable with the pulsed liquid circulation.

18. An apparatus according to claim 12 wherein said vessel simulating tube comprises a portion having an enlarged diameter simulating an aneurysm.

19. An apparatus according to claim 12 wherein said vessel simulating tube comprises a portion defining a restriction simulating a stenosis.

20. An apparatus according to claim 12 wherein said vessel simulating tube comprises a portion simulating an arteriovenous malformation or tumor.

21. A medical simulation apparatus comprising:

a housing;

a vessel simulating tube carried by said housing;

a pulsatile pump carried by said housing for causing pulsed liquid circulation through said vessel simulating tube; and an instrument access port connected in fluid communication with said vessel simulating tube;

said vessel simulating tube comprising an elastic material expanding and contracting with the pulsed liquid circulation.

22. An apparatus according to claim 21 wherein said vessel simulating tube comprises at least one of silicone, rubber and plastic.

23. An apparatus according to claim 21 wherein said vessel simulating tube comprises a portion having an enlarged diameter simulating an aneurysm.

24. An apparatus according to claim 21 wherein said vessel simulating tube comprises a portion defining a restriction simulating a stenosis.

25. An apparatus according to claim 21 wherein said vessel simulating tube comprises a portion simulating an arteriovenous malformation or tumor.

26. An apparatus according to claim 21 further comprising a liquid reservoir carried by said housing and connected in fluid communication with said pulsatile pump and said vessel simulating tube.

* * * * *